US012080450B2

(12) United States Patent
Nambara et al.

(10) Patent No.: US 12,080,450 B2
(45) Date of Patent: Sep. 3, 2024

(54) WIRING HARNESS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shintaro Nambara, Mie (JP); Takashi Takada, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 17/630,664

(22) PCT Filed: Jul. 20, 2020

(86) PCT No.: PCT/JP2020/028085
§ 371 (c)(1),
(2) Date: Jan. 27, 2022

(87) PCT Pub. No.: WO2021/020204
PCT Pub. Date: Feb. 4, 2021

(65) Prior Publication Data

US 2022/0254546 A1 Aug. 11, 2022

(30) Foreign Application Priority Data

Aug. 1, 2019 (JP) ................................ 2019-141864

(51) Int. Cl.
*H01B 7/285* (2006.01)
*H01B 7/00* (2006.01)
*H01R 4/70* (2006.01)

(52) U.S. Cl.
CPC .......... *H01B 7/285* (2013.01); *H01B 7/0045* (2013.01); *H01R 4/70* (2013.01)

(58) Field of Classification Search
CPC .... H01B 7/0045; H01B 7/2825; H01B 7/285; H01B 7/282; B60R 16/207; B60R 16/0215; H01R 4/70
See application file for complete search history.

(56) References Cited

U.S. PATENT DOCUMENTS

2005/0282938 A1* 12/2005 Yamaguchi .......... G02B 6/4436 523/513
2010/0071928 A1* 3/2010 Yamaguchi ............ H01B 3/447 528/65

(Continued)

FOREIGN PATENT DOCUMENTS

JP 2013-237741 A 11/2013
JP 2015-159070 A 9/2015

(Continued)

OTHER PUBLICATIONS

International Search Report issued on Oct. 13, 2020 for WO 2021/020204 A1 (4 pages).

*Primary Examiner* — Paresh Paghadal
(74) *Attorney, Agent, or Firm* — Venjuris, P.C.

(57) ABSTRACT

It is aimed to provide a wiring harness excellent in the waterproof performance of a part covered with a water blocking member also under a high temperature environment, a low temperature environment and a cold heat environment. In a wiring harness (10) in which an exposed conductor part (7) of an insulated wire (1, 2, 3) is covered with a water blocking member (8), the water blocking (Continued)

member (8) is a cured product of a composition containing a urethane (meth)acrylate and has two or more glass transition points.

5 Claims, 7 Drawing Sheets

(56) References Cited

U.S. PATENT DOCUMENTS

| | | | | |
|---|---|---|---|---|
| 2012/0055693 | A1* | 3/2012 | Yamaguchi | C08F 283/008 427/517 |
| 2015/0340848 | A1 | 11/2015 | Nakashima et al. | |
| 2016/0326410 | A1* | 11/2016 | Yamaguchi | C09K 3/1006 |
| 2017/0243673 | A1 | 8/2017 | Nakashima et al. | |
| 2022/0204809 | A1* | 6/2022 | Jin | B01D 69/12 |

FOREIGN PATENT DOCUMENTS

| | | | | |
|---|---|---|---|---|
| WO | WO-2015080101 | A1 * | 6/2015 | C08F 2/44 |
| WO | 2018/181373 | A1 | 10/2018 | |

* cited by examiner

WIRING HARNESS

CROSS REFERENCE TO RELATED APPLICATIONS

This application is a national phase of PCT application No. PCT/JP2020/028085, filed on 20 Jul. 2020, which claims priority from Japanese patent application No. 2019-141864, filed on 1 Aug. 2019, all of which are incorporated herein by reference.

TECHNICAL FIELD

The present disclosure relates to a wiring harness in which an exposed conductive part of an insulated wire is covered with a water blocking material.

BACKGROUND

A wiring harness constituted by a bundle of a plurality of insulated wires may include a spliced portion formed by partially removing coating materials in intermediate or end parts of a plurality of insulated wires and joining exposed conductive parts to each other. This spliced portion needs to be properly waterproofed. The spliced portion is waterproofed by covering the exposed conductive parts of the plurality of insulated wires including the spliced portion with an insulating material. For example, it is described in Patent Document 1 and Patent Document 2 that a spliced portion is waterproofed by covering exposed conductive parts of a plurality of insulated wires including a spliced portion with an ultraviolet curable material.

PRIOR ART DOCUMENT

Patent Document

Patent Document 1: JP 2015-159070 A
Patent Document 2: JP 2015-181322 A

SUMMARY OF THE INVENTION

Problems to be Solved

If the insulating material used to waterproof the spliced portion is a non-curable material or adhesive material, the insulating material may flow from the coating materials of the insulated wires to impair waterproof performance under a high temperature environment. Further, if the insulating material used to waterproof the spliced portion is a thermosetting material, a curing process may be long to reduce operability or the insulating material may flow to impair waterproof performance in a curing process. Furthermore, if the insulating material used to waterproof the spliced portion is an ultraviolet curable material, waterproof performance is good under a high temperature environment, but waterproof performance may be impaired under a low temperature environment and under a cold heat environment.

A problem to be solved by present disclosure is to provide a wiring harness excellent in the waterproof performance of a part covered with a water blocking material also under a high temperature environment, under a low temperature environ and under a cold heat environment.

Means to Solve the Problem

To solve the above problem, a wiring harness according to the present disclosure is a wiring harness in which an exposed conductor part of an insulated wire is covered with a water blocking material, wherein the water blocking material is a cured product of a composition containing a urethane (meth)acrylate and has two or more glass transition points.

Effect of the Invention

The wiring harness according to the present disclosure is excellent in the waterproof performance of a part covered with the water blocking material also under a high temperature environment, under a low temperature environ and under a cold heat environment.

DETAILED DESCRIPTION TO EXECUTE THE INVENTION

Description of Embodiments of Present Disclosure

Figure 1:
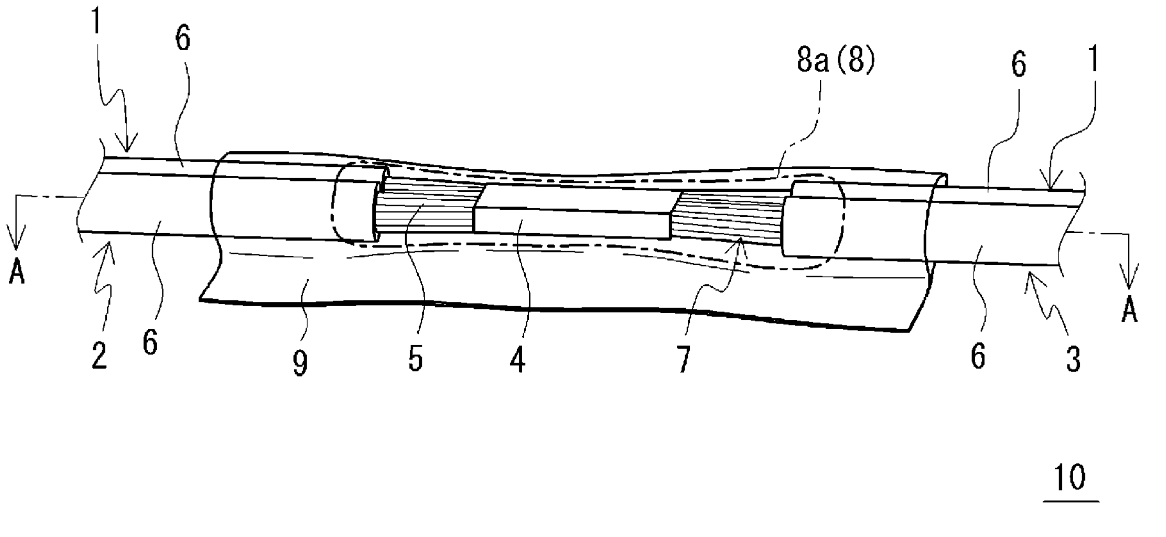
FIG. 1 is a schematic diagram of a wiring harness according to one embodiment.

First, embodiments of the present disclosure are listed and described.

(1) The wiring harness according to the present invention is a wiring harness in which an exposed conductor part of an insulated wire is covered with a water blocking material, wherein the water blocking material is a cured product of a composition containing a urethane (meth) acrylate and has two or more glass transition points. The wiring harness according to the present disclosure is excellent in the waterproof performance of the part covered with the water blocking member under a high temperature environment, under a low temperature environment and under a cold heat environment by the water blocking member having two or more glass transition points.

(2) A difference between the lowest glass transition point and the highest glass transition point, out of the two or more glass transition points, may be 50° C. or more. This is because waterproof performance under the low temperature environment, waterproof performance under the high temperature environment and waterproof performance under the cold heat environment are improved.

(3) The lowest glass transition point may be −20° C. or lower and the highest glass transition point may be 35° C. or higher. This is because waterproof performance under the low temperature environment, waterproof performance under the high temperature environment and waterproof performance under the cold heat environment are improved.

(4) The composition may further contain a (meth)acrylate other than the urethane (meth)acrylate. This is because the water blocking member easily has two or more glass transition points.

(5) The urethane (meth)acrylate may be a urethane (meth) acrylate having any one of a polyether chain, a polyester chain and a polycarbonate chain. This is because flexible components are easily introduced into a molecular structure and a cured product thereof is easily made relatively flexible.

(6) A content of the urethane (meth)acrylate in the entire composition may be 30 parts by mass or more and 80 parts by mass or less. This is because the cured product thereof is easily made relatively flexible.

(7) The composition may further contain a photopolymerization initiator, and a content of the photopolymerization initiator in the composition is 0.2 parts by mass or more and 2.0 parts by mass or less based on 100 parts by mass of a photocurable resin. This is because the surface curable and deep curability of the photocurable composition are excellent even with a low irradiance of 200 $mW/cm^2$. In this specification, excellent surface curability and deep curability mean that the curing of a surface and a deep part can be completed in less than 10 sec, preferably in less than 5 sec. In this specification, the irradiance means an illuminance without attenuation.

(8) The photopolymerization initiator may contain an acylphosphine oxide-based photopolymerization initiator. The acylphosphine oxide-based photopolymerization initiator has an excitation wavelength of 360 nm or more and 410 nm or less. The acylphosphine oxide-based photopolymerization initiator has a broad excitation range. Thus, an LED lamp having a center wavelength of 365 nm or more and 395 nm or less can be used as a light source at the time of light irradiation.

(9) The photopolymerization initiator may further contain an alkylphenone-based photopolymerization initiator. This is because the surface curability and deep curability of the photocurable composition are excellent even with a high irradiance of 2000 $mW/cm^2$ or more by combining the alkylphenone-based photopolymerization initiator with the acylphosphine oxide-based photopolymerization initiator.

(10) The composition may contain 0.1 part by mass or more and 1.0 part by mass or less of the acylphosphine oxide-based photopolymerization initiator and 0.5 parts by mass or more and 3.0 parts by mass or less of the alkylphenone-based photopolymerization initiator. This is because the surface curability and deep curability of the photocurable composition are excellent even with a low irradiance of 200 $mW/cm^2$ or less and with a high irradiance of 2000 $mW/cm^2$ or more.

(11) The exposed conductor part of the insulated wire includes a spliced portion formed by joining exposed conductor parts of a plurality of insulated wires to each other. This is because the waterproof performance of the part covered with the water blocking member are excellent under the high temperature environment, under the low temperature environment and under the cold heat environment.

Details of Embodiments of Present Disclosure

Specific examples of a wiring harness of the present disclosure are described below with reference to the drawings. Note that the present invention is not limited to these illustrations.

Figure 2:
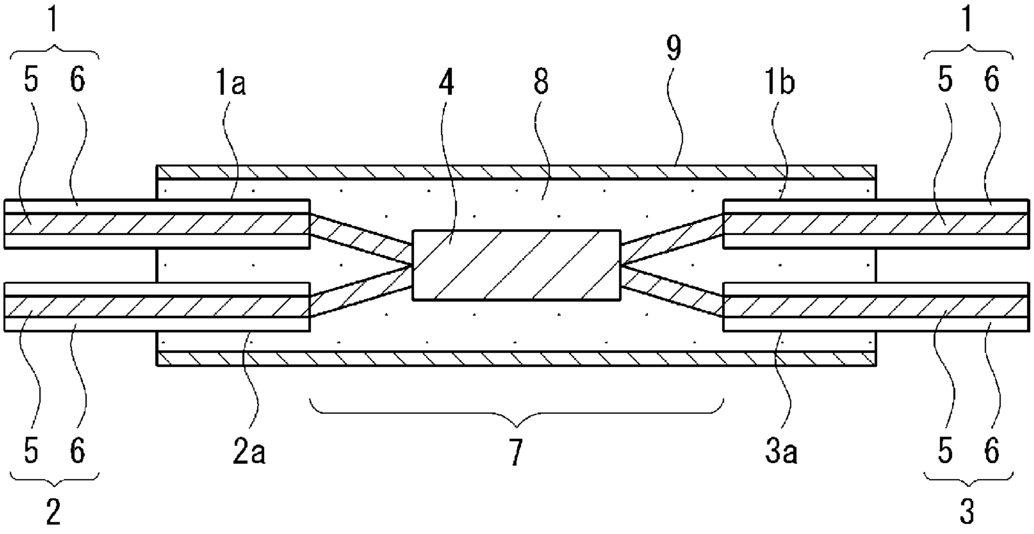
FIG. 2 is a section along A-A in FIG. 1.

As shown in FIGS. 1 and 2, a wiring harness 10 according to one embodiment is constituted by a wire bundle formed by bundling a plurality of (three) insulated wires 1 to 3. The insulated wire 1 is an insulated wire serving as a main wire, and the insulated wires 2, 3 are insulated wires serving as branch wires to be connected to the insulated wire 1 serving as the main wire in a spliced portion 4. The spliced portion 4 is a spliced portion in an intermediate part of the insulated wire 1 serving as the main wire (intermediate spliced portion).

Each of the insulated wires 1 to 3 is configured such that the outer periphery of a conductor 5 made of a core wire is covered by a coating material 6 made of an insulator. In the insulated wire 1 serving as the main wire, the coating material 6 is partially removed in a longitudinal intermediate part to partially expose the conductor 5 inside. In the insulated wire 2, 3 serving as the branch wire, the coating material 6 is partially removed in a longitudinal end part to partially expose the conductor 5 inside. The spliced portion 4 of the wiring harness 10 is configured by partially removing the coating materials 6 of the respective insulated wires 1 to 3 and joining the conductors 5 of the plurality of insulated wires 1 to 3 in the exposed conductor parts. The conductors 5 may be joined by welding, crimping using crimping terminals or another known joining method.

The wiring harness 10 is configured such that a conductor exposed portion 7 composed of the exposed conductor parts of the plurality of insulated wires 1 to 3 and including the spliced portion 4 and the outer peripheral surfaces of coating material end parts 1*a* to 3*a* and 1*b* of the respective insulated wires 1 to 3 adjacent to the conductor exposed portion 7 are covered by a water blocking material 8. A resin film 9 is arranged outside the water blocking material 8 to cover the outside of the water blocking material 8 in a range wider than the water blocking material 8. By covering the conductor exposed portion 7 with the water blocking material 8 to block water, the intrusion of water into the conductor exposed portion 7 from outside is prevented and a waterproofing effect is obtained.

The water blocking material 8 is constituted by a cured product of a composition containing a urethane (meth) acrylate. The water blocking material 8 has two or more glass transition points. The glass transition points are calculated from DMA (Dynamic Mechanical Analysis) measurements. DMA is a method for measuring mechanical properties of a sample by applying vibration to the sample and measuring a stress or strain generated thereby. In DMA, E' (storage elastic modulus) indicating a property of an elastic body, E" (loss elastic modulus) indicating a property of a viscous body and tan $\delta$=E"/E', which is a ratio of the both, are displayed. A peak top of this tan $\delta$ is set as the glass transition point.

Figure 3:
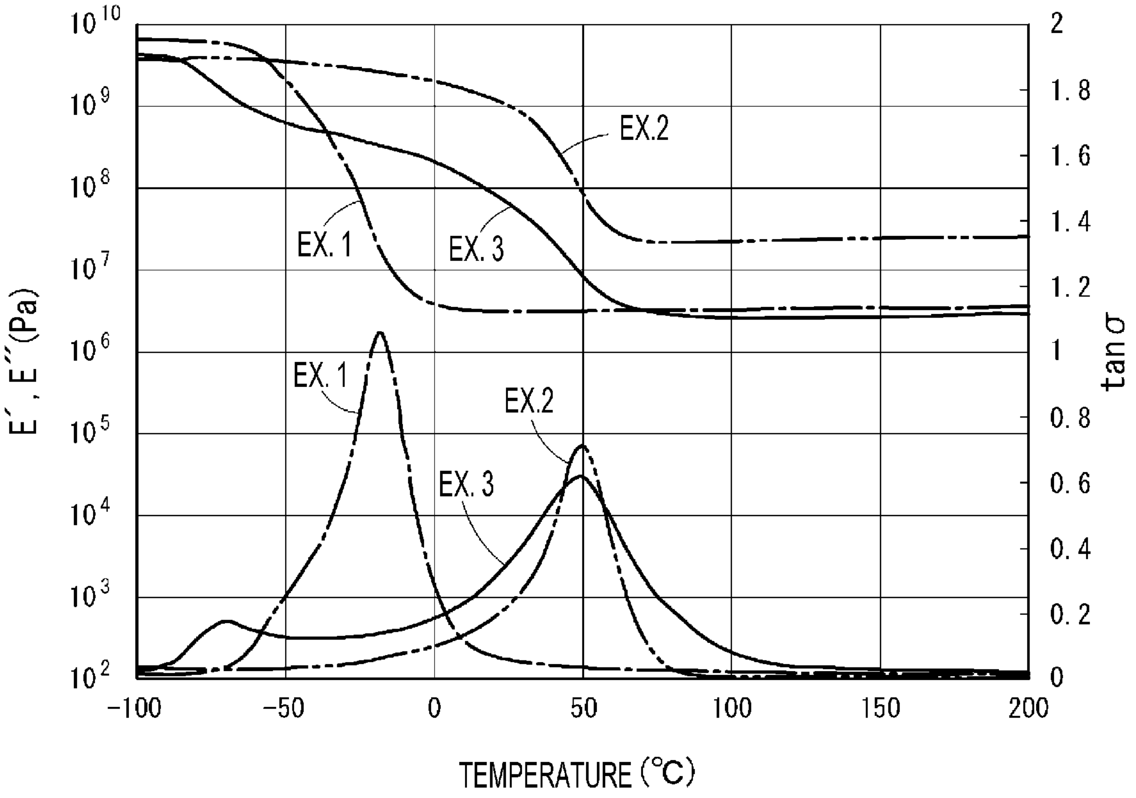
FIG. 3 is a graph showing examples of dynamic viscoelastic characteristics of organic polymers, wherein Example 1 is an example having a glass transition point only in a low temperature region, Example 2 is an example having a glass transition point only in a high temperature region and Example 3 is an example having glass transition points both in the low temperature region and the high temperature region.

Out of the two or more glass transition points of the water blocking material 8, the lowest glass transition point is located in a low temperature region and the highest glass transition point is located in a high temperature region. FIG. 3 is a graph showing examples of dynamic viscoelasticity characteristics of organic polymers. As shown in FIG. 3, the organic polymer having the glass transition point only in the low temperature region (Example 1) is excellent in waterproof performance under the low temperature environment since a stress applied to a cured product is alleviated under the low temperature environment, but waterproof performance is easily deteriorated under the high temperature environment since the cured product is suddenly softened as temperature increases. Further, the organic polymer having the glass transition point only in the high temperature region (Example 2) is excellent in waterproof performance under the high temperature environment since the softening of a cured product is suppressed under the high temperature environment, but waterproof performance is poor under the low temperature environment since the cured product is hard under the low temperature environment and a stress applied to the cured product is not alleviated. The water blocking material 8 having the glass transition points in the low temperature region and the high temperature region (Example 3) is excellent in waterproof performance under the low temperature environment since a stress applied to a cured product is alleviated under the low temperature environment. Further, the cured product is not suddenly softened by a temperature rise, the softening stops when the cured product is softened to a certain extent, and the softening of the cured product is suppressed under the high temperature environment, wherefore waterproof performance under the high temperature environment is also excellent. In this way, the waterproof performance of the part covered with the water blocking material 8 is excellent under the high temperature environment, under the low temperature environment and under the cold heat environment. The low temperature environment means a temperature environment of −40° C. or lower. The high temperature environment means a temperature environment of 120° C. or higher. The cold heat environment means a temperature environment alternately exposed to a temperature of −10° C. or lower and a temperature of 120° C. or higher.

A difference between the lowest glass transition point and the highest glass transition point, out of the two or more glass transition points of the water blocking material 8, is preferably 50° C. or more. As this difference increases, the lowest glass transition point is located in a lower temperature region, the highest glass transition point is located in a higher temperature region, and waterproof performance under the low temperature environment, waterproof performance under the high temperature environment and waterproof performance under the cold heat environment are improved. Further, from this perspective, the difference between the lowest glass transition point and the highest glass transition point is more preferably 70° C. or more, even more preferably 100° C. or more.

The lowest glass transition point, out of the two or more glass transition points of the water blocking material 8, is not particularly limited, but is preferably −20° C. or lower, more preferably −25° C. or lower and even more preferably −30° C. or lower, such as in terms of improving waterproof performance under the low temperature environment. Note that a lower limit value of the lowest glass transition point is not particularly limited, but the lowest glass transition point is preferably −100° C. or higher.

The highest glass transition point, out of the two or more glass transition points of the water blocking material 8, is not particularly limited, but is preferably 35° C. or higher, more preferably 50° C. or higher and even more preferably 100° C. or higher, such as in terms of excellent waterproof performance under the high temperature environment. Note that an upper limit value of the highest glass transition point is not particularly limited, but the highest glass transition point is preferably 150° C. or lower.

Mixing of two or more types of materials having different glass transition points when being singly cured and difficulty to mix materials to be mixed can be cited as a method for causing the water blocking material 8 to have two or more glass transition points. Difficulty to mix materials to be mixed means that the materials look to be evenly mixed, but have two or more glass transition points. If the materials are completely compatible, the mixture has one glass transition point even if the materials are two or more types of materials having different glass transition points when being singly cured.

A combination of two or more types of materials differing in the type of a monomer or oligomer (different material types) and a combination of two or more types of materials having the same type of monomer or oligomer, but differing in polymerization degree can be cited as a combination of two or more types of materials having different glass transition points when being singly cured. Further, the positions of the two or more glass transition points can be changed not only by the material types and the polymerization degrees, but also by a mixing ratio of the two or more types of materials.

Although the water blocking material 8 is constituted by the cured product of the composition containing the urethane (meth)acrylate, the water blocking material 8 may contain a (meth)acrylate component composed only of the urethane (meth)acrylate or may contain the urethane (meth)acrylate and (meth)acrylate(s) other than the urethane (meth)acrylate if the water blocking material 8 has two or more glass transition points.

In the urethane (meth)acrylate, flexible components are easily introduced into a molecular structure and a cured product thereof is easily made relatively flexible. On the other hand, in the (meth)acrylates other than urethane (meth) acrylate, flexible components are generally less likely to enter a molecular structure except special ones, and cured products of those tend to be relatively hard. Thus, the (meth)acrylate component for constituting the water blocking material 8 preferably contains the urethane (meth) acrylate and (meth)acrylate(s) other than urethane (meth) acrylate since this component easily has two or more glass transition points.

The urethane (meth)acrylate preferably has a glass transition point of −20° C. or lower when being singly cured. The glass transition point is more preferably −25° C. or lower and further preferably −30° C. or lower. Note that a lower limit value of this glass transition point is not particularly limited, but this glass transition point is preferably −100° C. or higher. The (meth)acrylate other than the urethane (meth)acrylate preferably has a glass transition point of 35° C. or higher when being singly cured. The glass transition point is more preferably 50° C. or higher and further preferably 100° C. or higher. Note that an upper limit value of this glass transition point is not particularly limited, but this glass transition point is preferably 150° C. or lower.

A content of the urethane (meth)acrylate in the entire composition is preferably 30 mass % or more and 80 mass % or less since the cured product of the composition is easily made relatively flexible. This content is more preferably 40 mass % or more and 70 mass % or less. The entire composition in this case means an entire solid content.

In the case of containing the (meth)acrylate other than the urethane (meth)acrylate, a content of the (meth)acrylate other than the urethane (meth)acrylate in the entire composition is preferably 20 mass % or more and 70 mass % or less since the cured product of the composition is easily made relatively hard. This content is more preferably 30 mass % or more and 60 mass % or less. The entire composition in this case means an entire solid content.

The urethan (meth)acrylate is an oligomer having a urethane bond obtained by the reaction of an isocyanate group and a hydroxy group and a (meth)acryloyl group. By the combination of a polyol and an isocyanate, the urethane (meth)acrylate can be designed from a hard one to a soft one. Since having a (meth)acryloyl group on an end of a molecular chain, the urethane (meth)acrylate can be photocured (ultraviolet cured). The urethane (meth)acrylate is synthesized from a polyol, an isocyanate and a hydroxy group-containing (meth)acrylate.

Urethane (meth)acrylates can be classified by the type of the polyol. A urethane (meth)acrylate containing a polyester polyol as the polyol is a polyester-based urethane (meth) acrylate having a polyester chain in a molecular structure. A urethane (meth)acrylate containing a polyether polyol as the polyol is a polyether-based urethane (meth)acrylate having a polyether chain in a molecular structure. A urethane (meth)acrylate containing a polycarbonate polyol as the polyol is a polycarbonate-based urethane (meth)acrylate having a polycarbonate chain in a molecular structure. A polyester-based urethane (meth)acrylate having a polyester chain in a molecular structure, a polyether-based urethane (meth)acrylate having a polyether chain in a molecular structure and a polycarbonate-based urethane (meth)acrylate having a polycarbonate chain in a molecular structure are preferable as the urethane (meth)acrylate since flexible components are easily introduced into the molecular structure and cured products thereof are easily made relatively flexible.

A polyester polyol used in the synthesis of the urethane (meth)acrylate is obtained from a polybasic organic acid and a low molecular weight polyol, and a polyester polyol having a hydroxyl group as a terminal group can be cited as a preferable one. The polybasic organic acid is not particularly limited, but examples thereof include dicarboxylic acids including saturated fatty acids such as oxalic acids, succinic acids, glutaric acids, adipic acids, pimelic acids, suberic acids, azelaic acids, sebacic acids and isosebacic acids, unsaturated fatty acids such as maleic acids and fumaric acids, and aromatic acids such as phthalic acids, isophthalic acids and terephthalic acids, acid anhydrides such as maleic anhydrides and phthalic anhydrides, dialkyl esters such as dimethyl terephthalate and dimer acids obtained by dimerization of unsaturated fatty acids. The low molecular weight polyol used together with the polybasic organic acid is not particularly limited and examples thereof include diols such as ethylene glycol, diethylene glycol, triethylene glycol, propylene glycol, dipropylene glycol, butylene glycol, neopentyl glycol and 1,6-hexylene glycol, triols such as trimethylol ethane, trimethylol propane, hexanetriol and glycerin, and hexols such as sorbitol. These may be singly used or two or more types of these may be used in combination.

Examples of the polyether polyol used in the synthesis of the urethane (meth)acrylate include polypropylene glycol (PPG), polytetramethylene glycol (PTMG), ethylene oxide modified polyols of these, and polyethylene glycol (PEG). These may be singly used or two or more types of these may be used in combination.

The polycarbonate polyol used in the synthesis of the urethane (meth)acrylate is obtained by polymerizing an alkylene diol as a monomer by a low molecular carbonate compound. Examples of the alkylene diol as the monomer include 1,6-hexane diol, 1.5-pentane diol, 1.4-butane diol and cyclohexane dimethanol. The alkylene diol as the monomer may be one type of these or may be two or more types of these. Examples of the polycarbonate diol include polyhexamethylene carbonate diol, polypentamethylene carbonate diol and polybutylene carbonate diol. These may be singly used or two or more types of these may be used in combination.

Examples of the polyisocyanate used in the synthesis of the urethane (meth)acrylate include diphenyl methane diisocyanate (MDI), polymethylene polyphenylene polyisocyanate (polymeric MDI), crude MDI (c-MDI), which is a mixture of MDI and polymeric MDI, dicyclohexylmethane diisocyanate (hydrogenated MDI), tolylene diisocyanate (TDI), hexamethylene diisocyanate (HDI), trimethyl hexamethylene diisocyanate (TMHDI), isophorone diisocyanate (IPDI), ortho-toluidine diisocyanate (TODI), naphthylene diisocyanate (NDI), xylene diisocyanate (XDI), paraphenylene diisocyanate (PDI), lysine diisocyanate methyl ester (LDI) and dimethyl diisocyanate (DDI). These may be singly used or two or more types of these may be used in combination.

Examples of the hydroxy group-containing (meth)acrylate used in the synthesis of the urethane (meth)acrylate include 2-hydroxyethyl (meth)acrylate, 2-hydroxypropyl (meth)acrylate, and 4-hydroxybutyl (meth)acrylate. These may be singly used or two or more types of these may be used in combination.

Examples of the (meth)acrylates other than the urethane (meth)acrylate include alkyl (meth)acrylate, cycloalkyl (meth)acrylate, alkenyl (meth)acrylate, hydroxyalkyl (meth) acrylate, benzyl (meth)acrylate, polyether (meth)acrylate and polyester (meth)acrylate. The (meth)acrylate other than the urethane (meth)acrylate may be either of a mono(meth) acrylate, which is a monofunctional (meth)acrylate, and a poly(meth)acrylate such as a di(meth)acrylate or tri(meth) acrylate, which is a polyfunctional (meta)acrylate having two or more functions.

Examples of the (meth)acrylates other than the urethane (meth)acrylate, which are classified as mono(meth)acrylates, more specifically include isobornyl (meth)acrylate, bornyl (meth)acrylate, tricyclodecanyl (meth)acrylate, dicyclopentanyl (meth)acrylate, dicyclopentenyl (meth)acrylate, cyclohexyl (meth)acrylate, benzyl (meth)acrylate, 4-butylcyclohexyl (meth)acrylate, 2-hydroxyethyl (meth)acrylate, 2-hydroxypropyl (meth)acrylate, 4-hydroxybutyl (meth) acrylate, methyl (meth)acrylate, ethyl (meth)acrylate, propyl (meth)acrylate, isopropyl (meth)acrylate, octyl (meth)acrylate, isooctyl (meth)acrylate, nonyl (meth)acrylate, decyl (meth)acrylate, isodecyl (meth)acrylate, undecyl (meth) acrylate, dodecyl (meth)acrylate, lauryl (meth)acrylate, stearyl (meth)acrylate, isostearyl (meth)acrylate, tetrahydrofurfuryl (meth)acrylate, polyethylene glycol mono(meth) acrylate, polypropylene glycol mono(meth)acrylate, methoxy ethylene glycol (meth)acrylate, ethoxy ethyl (meth)acrylate, methoxy polyethylene glycol (meth)acrylate, methoxy polypropylene glycol (meth)acrylate, and polyoxyethylene nonylphenyl ether acrylate.

Examples of the (meth)acrylates other than urethane (meth)acrylate, which are classified as the poly(meth)acrylates, more specifically include poly(meth) acrylates such as butane diol di(meth)acrylate, hexane diol di(meth)acrylate, nonane diol di(meth)acrylate, decane diol di(meth)acrylate, 2-butyl-2-ethyl-1,3-propane diol di(meth)acrylate, 2-hydroxy-3-acryloyloxy propyl methacrylate, dipropylene glycol di(meth)acrylate, tripropylene glycol di(meth)acrylate, triethylene glycol di(meth)acrylate, tetraethylene glycol di(meth)acrylate, tricyclodecane dimethylol di(meth)acrylate, 1,4-butane polyol di(meth)acrylate, 1,6-hexane polyol di(meth)acrylate, neopentyl glycol di(meth)acrylate, polyethylene glycol di(meth)acrylate, polypropylene glycol di(meth)acrylate, 9,9-bis [4-(2-acryloyl oxyethoxy)phenyl] fluorene, polyester di(meth)acrylate, tris(2-hydroxyethyl) isocyanurate tri(meth)acrylate, tris(2-hydroxyethyl) isocyanurate di(meth)acrylate, tricyclodecane dimethylol di(meth) acrylate, bisphenol A EO-modified di(meth)acrylate, di(meth)acrylate of hydrogenated bisphenol A EO-modified or PO-modified polyol, epoxy (meth)acrylate obtained by adding (meth)acrylate to diglycidyl ether of bisphenol A, triethylene glycol divinyl ether thing, trimethylol propane tri(meth)acrylate, pentaerythritol tri(meth)acrylate, trimethylol propane EO-modified tri(meth)acrylate, pentaerythritol tetra(meth)acrylate, tetrafurfuryl alcohol oligo(meth)acrylate, ethyl carbitol oligo(meth)acrylate, 1,4-butane diol oligo (meth)acrylate, 1,6-hexane diol oligo(meth)acrylate, trimethylol propane oligo(meth)acrylate, pentaerythritol oligo (meth)acrylate and (poly)butadiene (meth)acrylate.

The composition containing the urethane (meth) acrylate for forming the water blocking material 8 may contain a photopolymerization initiator. The photopolymerization initiator is a compound for starting the radical polymerization of a photocurable resin by absorbing light such as ultraviolet rays. The photocurable resin is a (meth)acrylate such as the urethane (meth)acrylate or the (meth)acrylate other than the urethane (meth)acrylate. Examples of the photopolymerization initiator include acylphosphine oxide-based photopolymerization initiators, alkylphenone-based photopolymerization initiators, intramolecular hydrogen extraction-type photopolymerization initiators, oxime ester-based photopolymerization initiators and cation-based photopolymerization initiators. These may be singly used or two or more types of these may be used in combination.

Because of the sizes of conductor diameters, a distance from the outer periphery of the photocurable composition arranged around the conductor exposed portion 7 to the center of the conductor bundle is not in the order of μm, but in the order of mm. In the case of photocuring the photocurable composition arranged around the conductor exposed portion 7, how far light reaches the inside in a depth direction of the photocurable composition arranged around the conductor exposed portion 7 is important with such a thickness. Thus, a content of the photopolymerization initiator in the photocurable composition is preferably set to 2.0 parts by mass or less based on 100 parts by mass of the photocurable resin. Since the content of the photopolymerization initiator is small, the absorption of irradiated light by the photopolymerization initiator located on the surface side of the photocurable composition arranged around the conductor exposed portion 7 is suppressed, the irradiated light easily reaches the inside in the depth direction of the photocurable composition arranged around the conductor exposed portion 7 and the inside in the depth direction can be sufficiently photocured. As just described, if the content of the photopolymerization initiator is relatively small, the surface curability and depth curability of the photocurable composition arranged around the conductor exposed portion 7 are excellent even with a low irradiance of 200 mW/$cm^2$ or less and with a high irradiance of 2000 mW/$cm^2$ or more. Further, from this perspective, the content of the photopolymerization initiator in the photocurable composition is more preferably 1.0 part by mass or less, even more preferably 0.5 parts by mass or less based on 100 parts by mass of the photocurable resin. On the other hand, from the perspective of ensuring an amount of the photopolymerization initiator sufficient to photocure the photocurable composition arranged around the conductor exposed portion 7, the content of the photopolymerization initiator in the photocurable composition is 0.2 parts by mass or more, more preferably 0.25 parts by mass or more and even more preferably 0.3 parts by mass or more based on 100 parts by mass of the photocurable resin.

A distance from a radial center to a radially outer side of the part of the conductor exposed portion 7 covered with the water blocking material 8 is in the order of mm and preferably 2 mm or more and 6 mm or less, more preferably 3 mm or more and 5 mm or less in consideration of the specific sizes of the conductor diameters.

The photopolymerization initiator preferably contains an acylphosphine oxide-based photopolymerization initiator. The acylphosphine oxide-based photopolymerization initiator has an excitation wavelength of 360 nm or more and 410 nm or less. The acylphosphine oxide-based photopolymerization initiator has a broad excitation range. Thus, a light source having a center wavelength of 365 nm or more and 395 nm or less may be used at the time of light irradiation. An LED lamp or the like can be cited as such a light source. The LED lamp is preferable as a light source in terms of power saving.

The photopolymerization initiator may further contain an alkylphenone-based photopolymerization initiator in addition to the acylphosphine oxide-based photopolymerization initiator. The alkylphenone-based photopolymerization initiator has an excitation wavelength near 245 nm, and not in a range of 365 nm or more and 395 nm or less. Thus, if a light source having a center wavelength of 365 nm or more and 395 nm or less is used, the photocurable composition is cured singly with the alkylphenone-based photopolymerization initiator. By combining the alkylphenone-based photopolymerization initiator with the acylphosphine oxide-based photopolymerization initiator, the surface curability and depth curability of the photocurable composition arranged around the conductor exposed portion 7 are excellent even with a low irradiance of 200 mW/$cm^2$ or less and with a high irradiance of 2000 mW/$cm^2$ or more.

If a light source having a center wavelength of 365 nm or more and 395 nm or less is used in the case of containing the acylphosphine oxide-based photopolymerization initiator and the alkylphenone-based photopolymerization initiator as the photopolymerization initiators, much of the alkylphenone-based photopolymerization initiator having an excitation wavelength outside the range of an irradiation wavelength remains without being decomposed in a cured product after light irradiation. On the other hand, much of the acylphosphine oxide-based photopolymerization initiator having an excitation wavelength in the range of the irradiation wavelength is decomposed in the cured product after light irradiation. Thus, the cured product after light irradiation contains more alkylphenone-based photopolymerization initiator than the acylphosphine oxide-based photopolymerization initiator.

In the case of containing the acylphosphine oxide-based photopolymerization initiator and the alkylphenone-based photopolymerization initiator as the photopolymerization initiators, the photocurable composition preferably contains 0.1 part by mass or more and 1.0 part by mass or less of the acylphosphine oxide-based photopolymerization initiator and 0.5 parts by mass or more and 3.0 parts by mass or less of the alkylphenone-based photopolymerization initiator based on the 100 parts by mass of the photocurable resin.

Examples of the acylphosphine oxide-based photopolymerization initiator include 2,4,6-trimethylbenzoyl diphenylphosphine oxide, bis(2,4,6-trimethylbenzoyl)-phenylphosphine oxide and bis(2,6-dimethoxybenzoyl)-2,4,4-trimethyl-pentylphosphine oxide. Omnirad TPO, Omnirad 819 and the like produced by IGM Resins B.V. can be cited as commercial products.

Examples of the alkylphenone-based photopolymerization initiator include benzyl dimethyl ketal-based photopolymerization initiators such as 2,2-dimethoxy-1,2-diphenylethane-1-one, α-hydroxyalkylphenone-based photopolymerization initiators such as 1-hydroxycyclohexyl-phenyl-ketone, 2-hydroxy-2-methyl-1-phenyl-propane-1-one, 1-[4-(2-hydroxyethoxy)-phenyl]-2-hydroxy-2-methyl-1-propane-1-one and 2-hydroxy-1-{4-[4-(2-hydroxy-2-methyl-propionyl)-benzyl]phenyl}-2-methyl-propane-1-one, and α-aminoacetophenone-based photopolymerization initiators such as 2-methyl-1-[4-(methylthio)phenyl]-2-morpholinopropane-1,2-benzyl-2-dimethylamino-1-(4-morpholinophenyl)-butane-1-one, 2-(dimethylamino)-2-[(4-methylphenyl)methyl]-1-[4-(4-morpholinyl) phenyl)-1-butanone, and N,N-dimethylamino acetophenone. Omnirad 651 and the like produced by IGM Resins B.V. can be cited as commercial products of the benzyl dimethyl ketal-based photopolymerization initiator. Omnirad 184, Omnirad 1173, Omnirad 2959, Omnirad 127 and the like produced by IGM Resins B.V. can be cited as commercial products of the α-hydroxyalkylphenone-based photopolymerization initiator. Omnirad 907, Omnirad 369, Omnirad 379 and the like produced by IGM Resins B.V. can be cited as commercial products of the α-aminoacetophenone-based photopolymerization initiator.

Omnirad MBF, Ominirad 754 and the like produced by IGM Resins B.V. can be cited as the intramolecular hydrogen extraction photopolymerization initiator. CGI-325, Irgacure OXE01 and Irgacure OXE02 produced by BASF Japan, N-1919 produced by ADEKA and the like can be cited as the oxime ester-based photopolymerization initiator. Omnirad 250, Omnirad 270 and the like produced by IGM Resins B.V. can be cited as the cation-based photopolymerization initiator.

The composition containing the urethane (meth)acrylate for constituting the water blocking material 8 may contain an additive.

The resin film 9 holds the composition around the conductor exposed portion 7 so that the composition before curing does not flow from the periphery of the conductor exposed portion 7. The resin film 9 may or may not be bonded to the outer surface of the water blocking material 8.

The resin film 9 has optical transparency so that the composition arranged around the conductor exposed portion 7 can be photocured. That is, irradiation light for photocuring the composition is allowed to be transmitted to such an extent capable of photocuring. The resin film 9 preferably has an ultraviolet transmittance of 50% or more, more preferably 70% or more and even more preferably 90% or more in terms of giving excellent optical transparency. Further, the resin film 9 is flexible to be deformable, following the deformation of the composition. In terms of optical transparency and flexibility, a thickness of the resin film 9 is preferably 200 μm or less, more preferably 150 μm or less, further preferably 100 μm or less and even more preferably 5 μm or more and 50 μm or less.

Resin wrap sheets made of olefin-based resins such as polyethylene and polypropylene, polyesters such as polyvinyl chloride, polyvinylidene chloride, polyvinylidene fluoride and polyethylene terephthalate, and polyamides such as nylon can be cited as the resin film 9. Out of these, wrap sheets of polyvinyl chloride resin, polyvinylidene chloride resin and polyvinylidene fluoride resin are preferable in terms of easy winding around the composition covering around the conductor exposed portion 7.

The resin film 9 may have an adhesive layer on a surface. The resin film 9 having the adhesive layer is preferable since the position thereof is easily fixed when the resin film 9 is wound. In the case of having the adhesive layer, an upper limit value of a thickness of the adhesive layer may be 50 μm or less, 30 μm or less or 20 μm or less.

Although the conductors 5 of the insulated wires 1 to 3 are constituted by stranded wires formed by twisting a plurality of strands, these may be single wires. The conductors 5 may be made of metal excellent in conductivity such as copper, copper alloy, aluminum or aluminum alloy. Metal plating of nickel or the like may be further applied to the metal surface. The coating material 6 may be formed using resin, thermoplastic elastomer, rubber or the like. Polyolefin, PCV and the like can be cited as a material.

The wiring harness 10 can be manufactured as follows. FIGS. 4A to 4D show a process of a wiring harness manufacturing method.

Figure 4A:
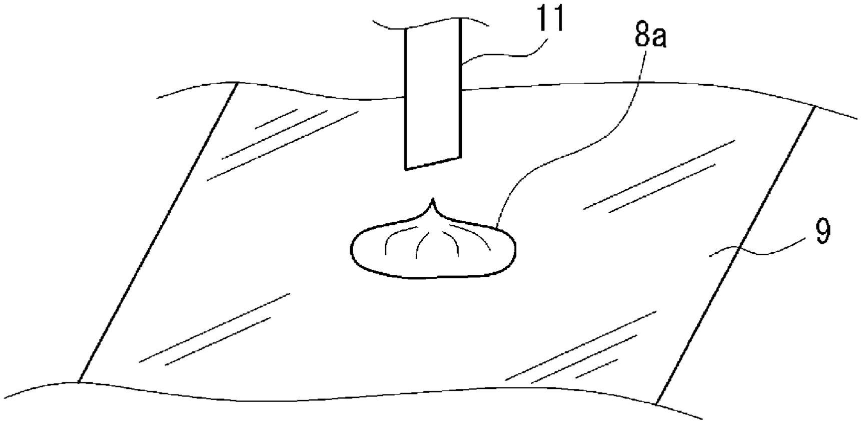
FIGS. 4A to 4D are process diagrams showing a manufacturing method of the wiring harness shown in FIG. 1.

As shown in FIG. 4A, the spliced portion 4 is formed by partially removing the coating material 6 of each insulated wire 1 to 3 and joining the conductors 5 of the plurality of insulated wires 1 to 3 in the exposed conductor parts. Then, the resin film 9 of a size to cover the conductor exposed portion 7 in a range wider than the conductor exposed portion 7 including the spliced portion 4 is prepared. An adhesive layer containing an adhesive is provided on the surface (inner side surface) of the resin film 9. Subsequently, an amount of a composition **8*a* for constituting the water blocking material 8 sufficient to cover the conductor exposed portion 7 is supplied onto the adhesive layer of the resin film 9 from a nozzle 11 of a discharging device. The composition 8*a*** at the time of discharging may be left at an ambient temperature or may be heated and only have to be in a liquid state.

Figure 4B:
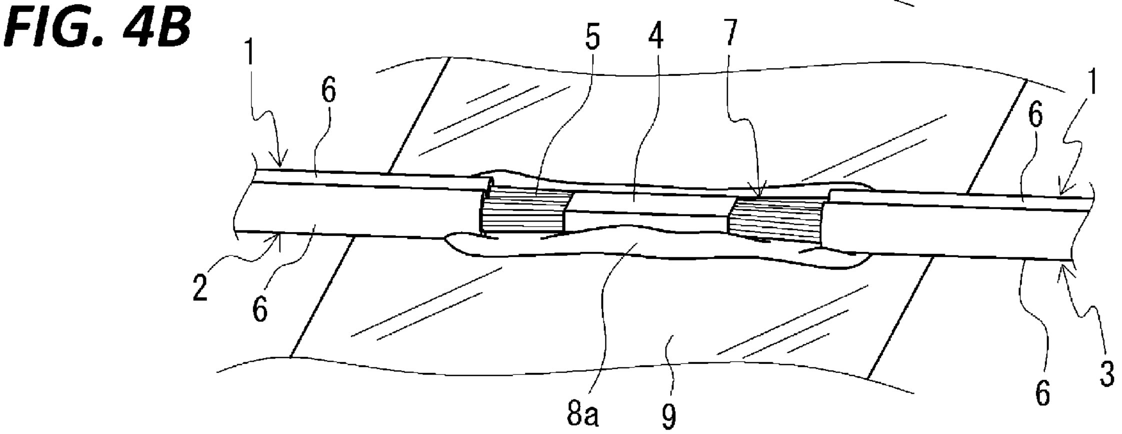

Subsequently, as shown in FIG. 4B, the conductor exposed portion 7 including the spliced portion 4 is placed on the photocurable composition **8*a* on the resin film 9**.

Figure 4C:
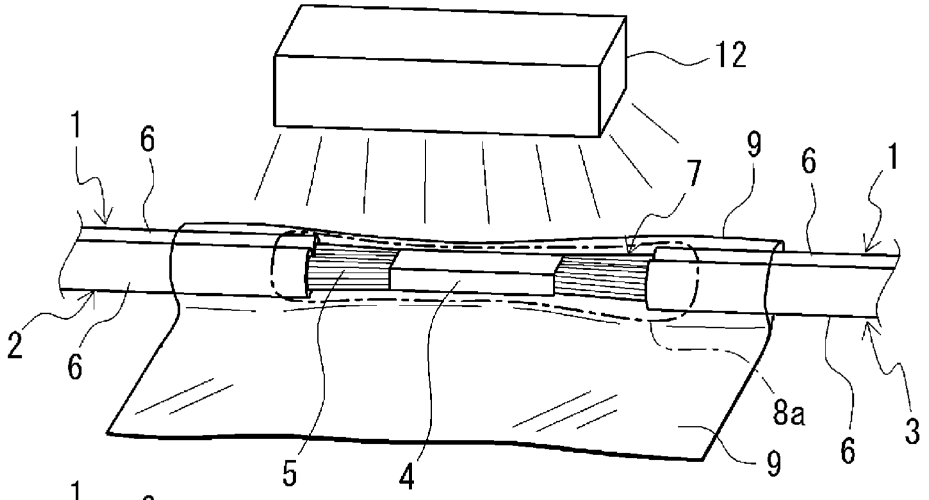

Subsequently, as shown in FIG. 4C, the resin film 9 is folded to cover upper sides of the conductor exposed portion 7 including the spliced portion 4 and the supplied composition **8*a*. End parts of the folded resin film 9 are overlapped outside the conductor exposed portion 7 including the spliced portion 4 in the width direction. The overlapped end parts of the resin film 9 are bonded by the adhesive. At this time, if necessary, the overlapped part of the resin film 9 may be squeezed toward the spliced portion 4. In this way, the composition 8*a*** can penetrate between and along the wire coatings and a splice diameter can be made constant.

Figure 4D:
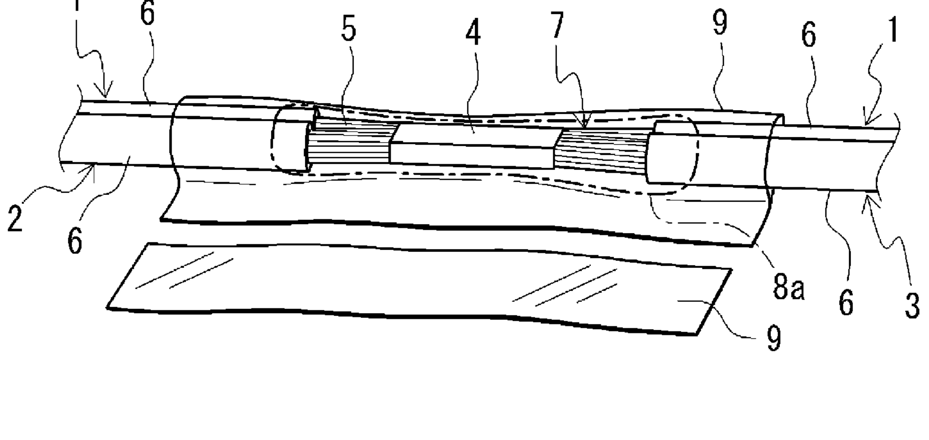

Subsequently, as shown in FIG. 4D, light (ultraviolet rays) is irradiated to the composition **8*a* covering the conductor exposed portion 7 through the resin film 9 from a light (ultraviolet) irradiation device 12. An irradiance of the irradiation light may be 50 $mW/cm^2$ or more and 10000 $mW/cm^2$ or less, preferably 50 $mW/cm^2$ or more and 5000 $mW/cm^2$ or less. The composition 8*a* is photocured to become a cured product, whereby the water blocking material 8 is formed. Subsequently, the overlapped end parts of the resin film 9 are cut if necessary. In the above way, the wiring harness 10** is manufactured.

The composition **8*a* for constituting the water blocking material 8 is the above composition. The composition contains the urethane (meth)acrylate. The composition 8*a* for constituting the water blocking material 8 can contain an acylphosphine oxide-based photopolymerization initiator as the photopolymerization initiator. Since the acylphosphine oxide-based photopolymerization initiator has an excitation wavelength of 360 nm or more and 410 nm or less, the composition 8***a* for constituting the water blocking material 8 can be cured by irradiating light of 365 nm or more and 395 nm or less. Then, a power-saving LED lamp having a center wavelength of 365 nm or more and 395 nm or less can be used as a light source. The acylphosphine oxide-based photopolymerization initiator has a broad excitation range.

The composition 8*a* for constituting the water blocking material 8 can contain an acylphosphine oxide-based photopolymerization initiator and an alkylphenone-based photopolymerization initiator as the photopolymerization initiators. In this case, the surface curability and deep curability of the composition 8*a* for constituting the water blocking material 8 are excellent even with a high irradiance of 2000 $mW/cm^2$ or more. In this way, light can be irradiated with a high irradiance of 2000 $mW/cm^2$ or more. A light irradiation time can be set to be 1 sec or more and 120 sec or less, preferably 1 sec or more and less than 10 sec, and more preferably 1 sec or more and less than 5 sec.

In the composition 8*a* for constituting the water blocking material 8, a content of the photopolymerization initiator can be set to 2.0 parts by mass or less based on 100 parts by mass of the photocurable resin. In this case, since the surface curable and deep curability of the composition 8*a* for constituting the water blocking material 8 are excellent even with a low irradiance of 200 $mW/cm^2$, light can be irradiated with a low irradiance of 200 $mW/cm^2$. A light irradiation time can be set to be 1 sec or more and 120 sec or less, preferably 1 sec or more and less than 10 sec, and more preferably 1 sec or more and less than 5 sec.

According to the wiring harness 10 configured as described above, the waterproof performance of the part covered with the water blocking material 8 is excellent also under a high temperature environment, a low temperature environment and a cold heat environment.

Figure 5:
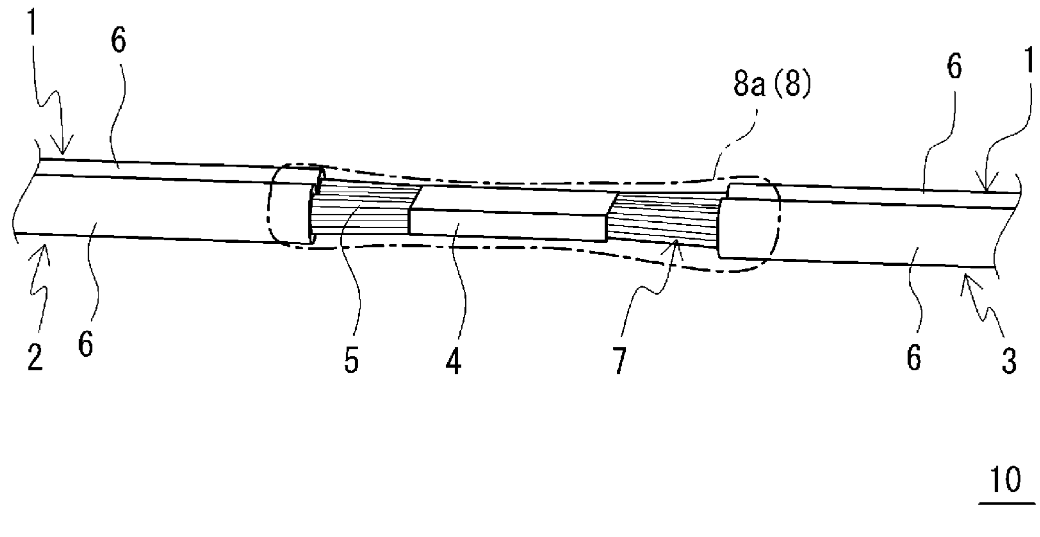
FIG. 5 is a schematic diagram of a wiring harness according to another embodiment.

The resin film 9 is used in the wiring harness 10. However, since the composition 8*a* is easily applied in a predetermined range, the resin film 9 may not be used if the composition 8*a* can be applied in the predetermined range by another method. Further, if adhesion to the cured product of the composition 8*a* is low, a wiring harness including no resin film 9 can also be manufactured, such as by removing the resin film 9 after curing. FIG. 5 shows a wiring harness 20 including no resin film 9. The wiring harness 20 is configured similarly to the wiring harness 10 except that the resin film 9 is not provided, and other description is omitted.

Figure 6:
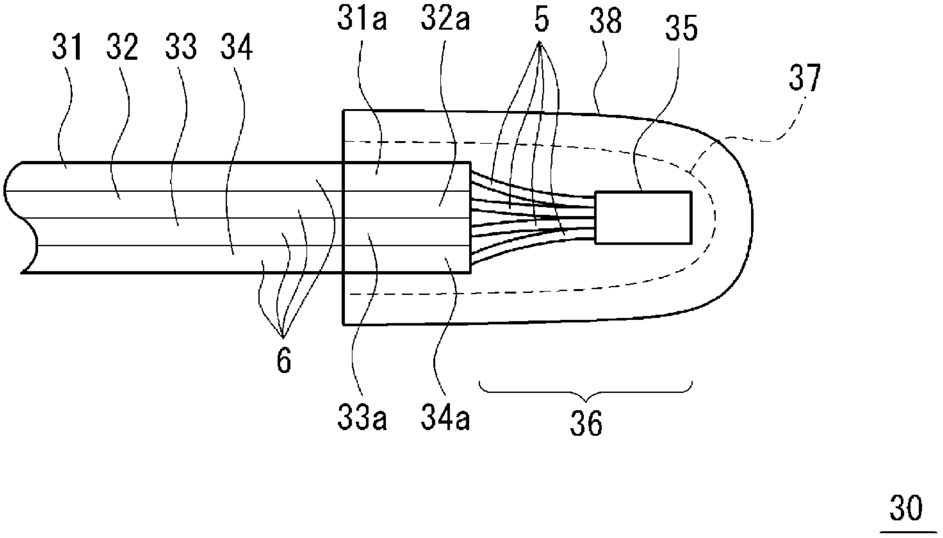
FIG. 6 is a schematic diagram of a wiring harness according to still another embodiment.

FIG. 6 shows a wiring harness according to still another embodiment. The wiring harness 30 is constituted by a wire bundle formed by bundling a plurality of (four) insulated wires 31 to 34.

Each of the insulated wires 31 to 34 is configured such that the outer periphery of a conductor 5 made of a core wire is covered by a coating material 6 made of an insulator. In each insulated wire 31 to 34, the coating material 6 is partially cut in a longitudinal end part to expose a part of the conductor 5 inside. A spliced portion 35 of the wiring harness 30 is configured by joining the conductors 5 of the plurality of insulated wires 31 to 34 in exposed conductor parts. The conductors 5 may be joined by welding, crimping using crimping terminals or another known joining method. The spliced portion 35 is a spliced portion in end parts of all of the plurality of insulated wires 31 to 34 (end spliced portion).

The wiring harness 30 includes a water blocking material 37 for blocking water by continuously covering a conductor exposed portion 36 formed by a bundle of the exposed conductors of the plurality of insulated wires 31 to 34 and including the spliced portion 35 and the outer peripheral surfaces of coating material end parts 31*a* to 34*a* of the respective insulated wires 31 to 34 adjacent to the conductor exposed portion 36. By covering the conductor exposed portion 36 with the water blocking material 37, the intrusion of water into the conductor exposed portion 36 from outside is prevented and a waterproofing effect is obtained. The water blocking material 37 is constituted by a cured material of the above composition containing the urethane (meth) acrylate, similarly to the water blocking material 8.

The wiring harness 30 can be manufactured, for example, by filling a composition into a cap-shaped transparent container 38 having optical transparency to transmit irradiation light for photocuring the composition to such an extent capable of photocuring, immersing the conductor exposed portion 36 including the spliced portion 35 of the wire bundle and the coating material end parts 31*a* to 34*a* of the respective insulated wires 31 to 34 adjacent to the conductor exposed portion 36 in the composition filled into the transparent container 38 and irradiating light in this state to photocure the composition. The water blocking material 37 may be removed from the cap-shaped transparent container 38.

EXAMPLES

The present disclosure is described below by means of examples, but is not limited by the examples.

<Preparation of Photocurable Composition>

Photocurable compositions were prepared by mixing a urethane acrylate oligomer, an acrylate monomer and a photopolymerization initiator in compositions shown in Table 1.

(Glass Transition Point)

Figure 7:
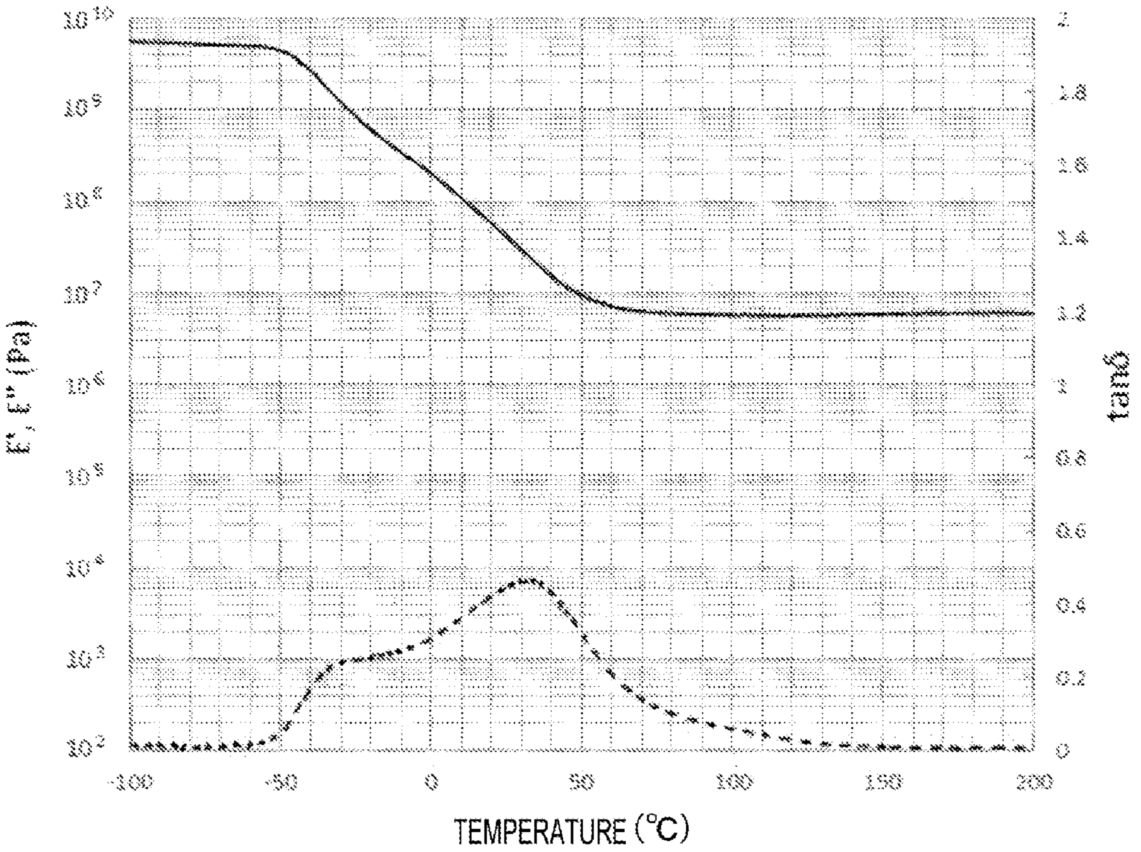
FIG. 7 is a graph showing measurement results on dynamic viscoelasticity of sample 4.

Glass transition points were calculated from DMA (Dynamic Mechanical Analysis) measurements for cured products of the prepared photocurable compositions. Test pieces were in the form of sheets of 20 mm×10 mm (thickness of 300 μm) and ultraviolet rays were irradiated for 6 sec by a UV lamp (produced by SEN Lights Co., Ltd., 500 $mW/cm^2$), whereby the photocurable compositions were cured. In DMA, a storage elastic modulus E' and a loss elastic modulus E" were measured and tan δ=E'/E", which is a ratio of the both, was displayed. A peak top of tan δ was set as a glass transition point. FIG. 7 shows a graph of a DMA measurement result of sample 4 as a representative example. DMA measurement conditions are as follows.

Measuring Device: [DMS 6100] produced by SII Nanotechnology Inc.

Measuring Temperature Range: −100° C. or higher and 300° C. or lower

Temperature Rising Rate: 2° C./min

Inter-Chuck Distance: 20 mm

Frequency: 1 Hz

Strain Amplitude: 10 μm

Measurement Atmosphere: Air

<Fabrication of Waterproof Intermediate Spliced Portion>

An intermediate spliced work was fabricated using a polyvinyl chloride (PVC) coated wire having ϕ of 2.6 mm as a main wire and two PVC coated wires having ϕ of 2.6 mm as branch wires.

<Waterproofing Treatment>

As shown in FIG. 4A, a transparent PVC tape having an ultraviolet transmittance of 90% was prepared. The PVC tape includes a PVC layer of 110 μm and an adhesive layer of 20 μm. 1.1 g of the prepared photocurable composition was applied to a center of this adhesive layer. Subsequently, as shown in FIG. 4B, an intermediate spliced portion of the fabricated intermediate spliced work was placed on the photocurable composition on the adhesive layer. Subsequently, as shown in FIG. 4C, the PVC tape was folded and bonded. In this way, the photocurable composition was formed to cover the intermediate spliced portion and coating material surfaces over a length of about 20 mm Subsequently, as shown in FIG. 4D, after ultraviolet rays (5000 $mW/cm^2$x3 sec) were irradiated to the photocurable composition covered with the PVC tape to cure the photocurable composition using an LED irradiator (LED-UV lamp) having a center wavelength of 385 nm, an extra part of the PVC tape was cut.

temperature at 120° ° C. for 30 min after maintaining temperature at −10° C. for 30 min 500 times and 1000 times. "C" denotes a case where air leakage was confirmed in 500 cycles, "B" denotes a case where air leakage was confirmed in 1000 cycles, and "A" denotes a case where air leakage was not confirmed in 1000 cycles.

Further, the cold test was conducted by repeating a process cycle of increasing temperature up to 120° C. and maintaining temperature at 120° ° C. for 30 min after maintaining temperature at −40° C. for 30 min 300 times and 500 times. "C" denotes a case where air leakage was confirmed in 300 cycles, "B" denotes a case where air leakage was confirmed in 500 cycles, and "A" denotes a case where air leakage was not confirmed in 500 cycles.

| | | Sample 1 | Sample 2 | Sample 3 | Sample 4 | Sample 5 | Sample 6 | Sample 7 |
|---|---|---|---|---|---|---|---|---|
| Monomer | Isobornyl acrylate | 50 | 50 | 60 | 45 | — | — | 30 |
| | 1,6-hexane diol diacrylate | — | — | — | — | 30 | — | — |
| | ε-caprolactone modified tris-(2-acryloxyethyl)isocyanurate | — | — | — | — | — | 30 | — |
| Oligomer | polycarbonate-based urethane acrylate | 50 | — | — | — | — | — | — |
| | Polyether-based urethane acrylate | — | 50 | — | — | — | — | — |
| | Polycarbonate-based urethane acrylate | — | — | 40 | — | — | — | — |
| | Polyester-based urethane acrylate | — | — | — | 55 | — | — | — |
| | Urethane acrylate | — | — | — | — | 70 | — | — |
| | Urethane acrylate | — | — | — | — | — | 70 | — |
| | Polyether-based urethane acrylate | — | — | — | — | — | — | 70 |
| Photopoly-merization | Diphenyl (2,4,6-trimethoxy benzoyl)phosphine oxide | 0.3 | 0.2 | 0.5 | 0.3 | 0.5 | 0.5 | 0.5 |
| Initiator | 1-hydroxycyclohexyl-phenyl-ketone | 1.5 | 1.2 | 2.0 | 1.5 | 2.0 | 2.0 | 1.5 |
| Glass transition point of cured product (° C.) | | −35<br>15<br>80<br>125 | −70<br>50 | −25<br>30<br>115 | −30<br>35 | 50 | −20 | 20 |
| Glass transition point difference (highest-lowest) (° C.) | | 160 | 120 | 140 | 65 | — | — | — |
| Waterproof performance | Under high temperature environment (120° C.) | A | B | A | B | B | C | C |
| | Under low temperature environment (−40° C.) | A | A | A | A | C | B | B |
| | Cold cycle (−10° C. × 30 min ↔120° C. × 30 min) | A | B | A | B | C | C | C |
| | Cold cycle (−40° C. × 30 min ↔120° C. × 30 min) | A | B | B | B | C | C | C |

[Evaluation of Waterproof Performance by Pressure Test]

Waterproof performance was evaluated from a pressure test of a waterproofed wiring harness. In the pressure test, an air pressure of 200 kPa was applied to each of all insulated wires of the wiring harness for 1 min with a waterproofed intermediate spliced portion entirely immersed in water to observe the presence or absence of air leakage. The wiring harness was assumed as good if there was no air leakage in all the insulated wires, whereas the wiring harness was assumed as defective if air leakage was confirmed in any one of the insulated wires while the air pressure of 200 kPa was applied for 1 min. This pressure test was conducted after leaving the wiring harness at a high temperature, after leaving the wiring harness at a low temperature and after a cold test.

High temperature leaving conditions were 120° C.×500 hrs and 120° ° C.×1000 hrs. "C" denotes a case where air leakage was confirmed at 120° ° C.×500 hrs, "B" denotes a case where air leakage was confirmed at 120° ° C.×1000 hrs, and "A" denotes a case where air leakage was not confirmed at 120° ° C.×1000 hrs.

Low temperature leaving conditions were −40° C.×2000 hrs and −40° ° C.×4000 hrs. "C" denotes a case where air leakage was confirmed at −40° ° C.×2000 hrs, "B" denotes a case where air leakage was confirmed at −40° ° C.×4000 hrs, and "A" denotes a case where air leakage was not confirmed at −40° ° C.×4000 hrs.

The cold test was conducted by repeating a process cycle of increasing temperature up to 120° ° C. and maintaining As shown in FIG. 7, the cured product of the composition of sample 4 has two or more glass transition points. Specifically, the cured product of the composition of sample 4 has two glass transition points at −30° C. and 35° C. FIG. 7 shows a DMA measurement result of the cured product of the composition of sample 4 as a representative example. DMA measurements were similarly conducted for other samples and similar measurement curves were obtained.

Compositions of samples 1 to 4 are compositions containing a urethane (meth)acrylate and cured products thereof have two or more glass transition points. Wiring harnesses having the intermediate spliced portions waterproofed using the compositions of samples 1 to 4 obtained B or better evaluation in waterproof performance after being left at a high temperature, after being left at a low temperature and after the cold test, and it is understood that the waterproof performance of the part covered with the water blocking member is excellent under a high temperature environment, under a low temperature environment and a cold heat environment.

In contrast, compositions of samples 5 to 7 are compositions containing a urethane (meth)acrylate, but cured products thereof do not have two or more glass transition points. The cured product of the composition of sample 5 has the glass transition point at 50° C. in a high temperature region, and a wiring harness having an intermediate spliced portion waterproofed using the composition of sample 5 is excellent in waterproof performance under the high temperature environment, but poor in waterproof performance under the low temperature environment and the cold heat environment. The cured product of the composition of sample 6 has the glass transition point at −20° C. in a low temperature region, and a wiring harness having an intermediate spliced portion waterproofed using the composition of sample 6 is excellent in waterproof performance under the low temperature environment, but poor in waterproof performance under the high temperature environment and the cold heat environment. The cured product of the composition of sample 7 has the glass transition point at 20° C. in the low temperature region, and a wiring harness having an intermediate spliced portion waterproofed using the composition of sample 7 is excellent in waterproof performance under the low temperature environment, but poor in waterproof performance under the high temperature environment and the cold heat environment.

Although the embodiments of the present disclosure have been described in detail above, the present disclosure is not limited to the above embodiments at all and various changes can be made without departing from the gist of the present disclosure.

What is claimed is:

1. A wiring harness comprising:

an insulated wire; and a water blocking material that covers an exposed conductor part of the insulated wire, wherein the water blocking material is a cured product of a composition containing a urethane (meth)acrylate having a polycarbonate chain and a (meth)acrylate and has two or more glass transition points, a content of the urethane (meth)acrylate in the composition is 30 parts by mass or more and 80 parts by mass or less, the composition further contains an acylphosphine oxide-based photopolymerization initiator and an alkylphenone-based photopolymerization initiator, and the composition contains 0.1 part by mass or more and 1.0 part by mass or less of the acylphosphine oxide-based photopolymerization initiator and 0.5 parts by mass or more and 3.0 parts by mass or less of the alkylphenone-based photopolymerization initiator.

2. The wiring harness of claim 1, wherein a difference between the lowest glass transition point and the highest glass transition point, out of the two or more glass transition points, is 50° C. or more.

3. The wiring harness of claim 2, wherein the lowest glass transition point is −20° C. or lower and the highest glass transition point is 35° C. or higher.

4. The wiring harness of claim 1, wherein the exposed conductor part of the insulated wire includes a spliced portion formed by joining exposed conductor parts of a plurality of insulated wires to each other.

5. A wiring harness comprising:

an insulated wire; and a water blocking material that covers an exposed conductor part of the insulated wire, wherein the water blocking material is a cured product of a composition containing a urethane (meth)acrylate having a polycarbonate chain and a (meth)acrylate and has three or more glass transition points, a content of the urethane (meth)acrylate in the composition is 30 parts by mass or more and 80 parts by mass or less, the composition further contains an acylphosphine oxide-based photopolymerization initiator and an alkylphenone-based photopolymerization initiator, and the composition contains 0.1 part by mass or more and 1.0 part by mass or less of the acylphosphine oxide-based photopolymerization initiator and 0.5 parts by mass or more and 3.0 parts by mass or less of the alkylphenone-based photopolymerization initiator.

* * * * *